United States Patent [19]
Kammeraad et al.

[11] Patent Number: 5,921,728
[45] Date of Patent: Jul. 13, 1999

[54] REAMER WITH RADIAL RELIEF AND CUTTING LAND

[75] Inventors: David A. Kammeraad, Holland; James E. Koats, Grand Haven, both of Mich.

[73] Assignee: K-Line Industries, Inc., Holland, Mich.

[21] Appl. No.: 09/178,135

[22] Filed: Oct. 23, 1998

[51] Int. Cl.$^6$ ................................................. B23B 51/00
[52] U.S. Cl. ............................................ 408/227; 408/230
[58] Field of Search ............................. 408/227, 229, 408/230

[56] References Cited

U.S. PATENT DOCUMENTS

| | | |
|---|---|---|
| 2,940,342 | 6/1960 | Lavallee . |
| 3,828,415 | 8/1974 | Kammeraad et al. . |
| 4,091,525 | 5/1978 | Karasiewicz et al. ............. 408/82 |
| 4,103,662 | 8/1978 | Kammeraad . |
| 4,231,693 | 11/1980 | Kammeraad ................. 408/230 |
| 4,740,121 | 4/1988 | Arnold ......................... 408/224 |
| 4,932,815 | 6/1990 | Krauss ......................... 408/224 |
| 5,186,584 | 2/1993 | Muller et al. ................. 408/26 |
| 5,201,616 | 4/1993 | Alverio ....................... 408/224 |
| 5,249,555 | 10/1993 | Kammeraad et al. . |

*Primary Examiner*—Andrea L. Pitts
*Assistant Examiner*—Adesh Bhargava
*Attorney, Agent, or Firm*—Price, Heneveld, Cooper, DeWitt & Litton

[57] ABSTRACT

A finish reamer adapted to finish ream bronze-based valve guides and valve inserts is disclosed. The reamer includes a body section having a plurality of spiral flutes formed therein. The flutes define a plurality of cutting blades. Each cutting blade has an axially extending radial relief formed therein, and a land with a margin having a non-uniform width that is smaller near its leading end and larger near its trailing end.

20 Claims, 3 Drawing Sheets

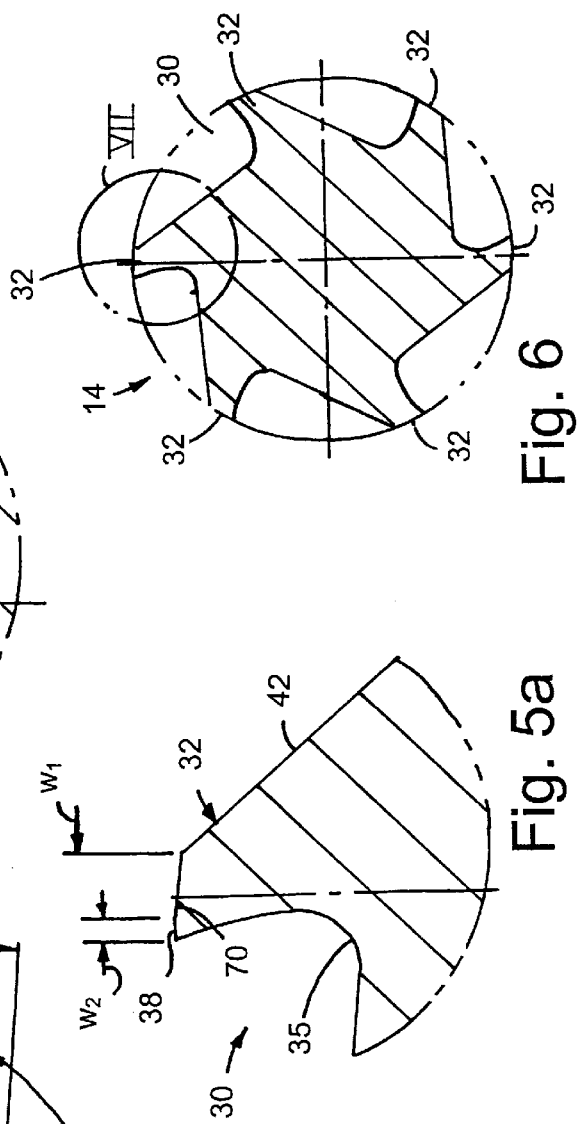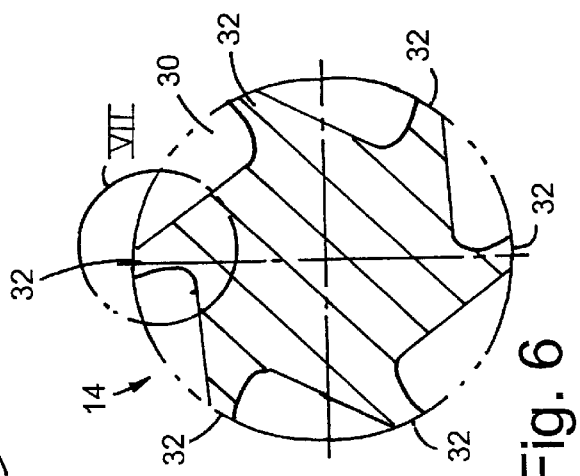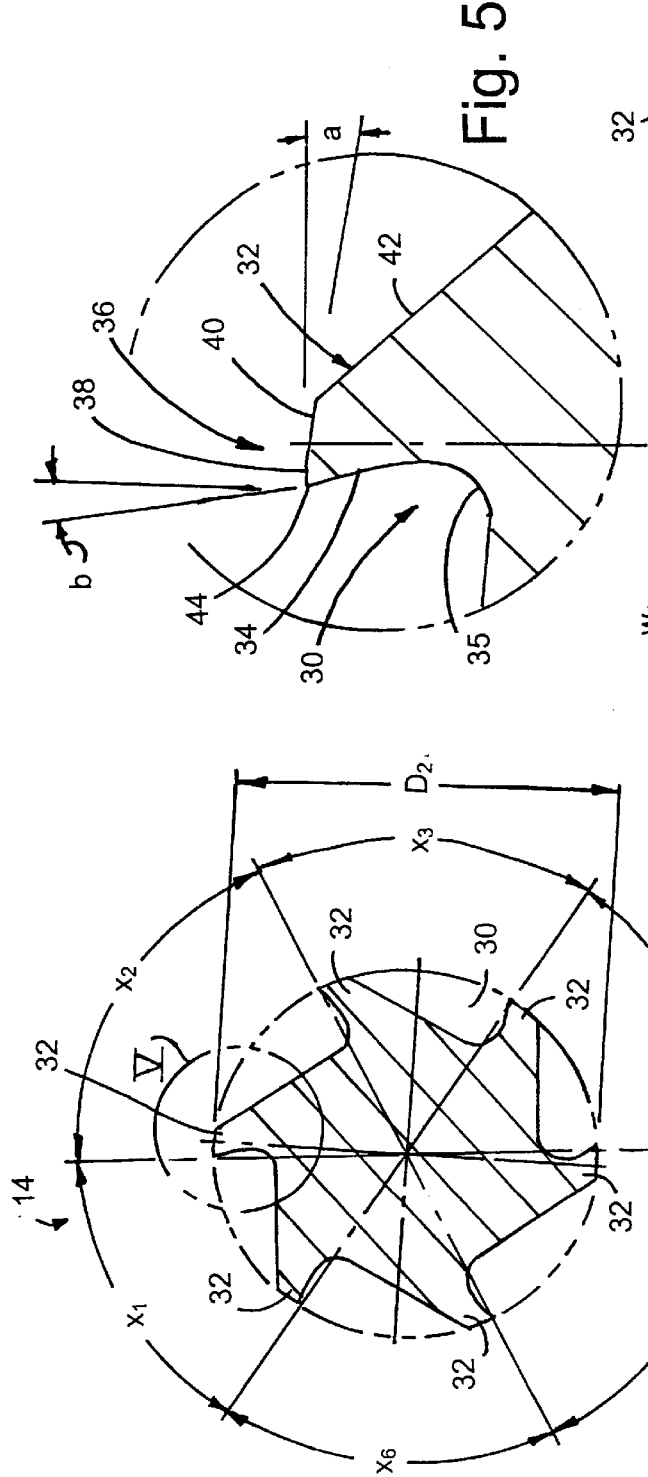

REAMER WITH RADIAL RELIEF AND CUTTING LAND

BACKGROUND OF THE INVENTION

The present invention is related to cutting tools and more particularly to finish reamers.

In a wide variety of manufacturing and repair or reconditioning processes, it is necessary to accurately cut a hole or bore to a predetermined inner diameter. For example, such a cutting operation is performed in some of the various methods, which have heretofore been developed, for rebuilding of internal combustion engine valve guides. After extensive use, the valve guides of an internal combustion engine will wear, presenting excessive clearance between the valve guide and the valve stem. This excessive clearance may have an adverse effect on valve train operation and also increases undesirable emissions from the internal combustion engine.

The various methods heretofore proposed have included lining or relining of the worn valve guides with generally cylindrical inserts. In a typical rebuilding process, a worn valve guide is bored out to receive the insert which is press fit or forced into the bored out, valve guide passageway. The insert is finish reamed, so that the internal diameter is accurately cut and dimensioned with respect to the stem of the valve, which reciprocates within the rebuilt valve guide.

Inserts of various materials, such as cast iron, thin wall, silicon bronze-aluminum, manganese bronze, phosphor bronze, and the like, have been employed in such rebuilding methods. Cast iron inserts present certain inherent problems primarily related to cost, rate of wear, and heat transfer characteristics. In order to overcome these problems, different forms of bronze inserts have been developed. Notably, the bronze-based materials are harder than cast iron. However, the bronze-based inserts provide increased wear characteristics and heat transfer properties. Examples of inserts may be found in U.S. Pat. Nos. 3,828,415 entitled Method and Apparatus for Rebuilding Valve Guides, issued Aug. 13, 1974, to James A. Kammeraad et al., 4,103,662 entitled Insert for Rebuilding Valve Guides, issued Aug. 1, 1978, to James A. Kammeraad, and 5,249,555 entitled Valve Guide Insert, issued on Oct. 5, 1993, to James A. Kammeraad et al.

One of the inserts disclosed in U.S. Pat. No. 3,828,415 is a thin wall tubular member stamped from a blank of phosphor bronze and progressively formed into a tubular shape leaving a longitudinal slit. The insert is forced into a reamed valve guide by means of an adapter. The outer diameter of the insert is greater than the reamed valve guide, so that the insert is radially compressed when it is forced into the reamed valve guide. The insert is then trimmed, so that it is flush with the valve guide. The inner surface of the insert may then be knurled to flow the metal and seal off the passage through the slit. Finally, the valve guide is finish reamed to a predetermined diameter as required for the particular size of valve stem. The tubular insert has a wall thickness in the range of 10 to 25 thousandths of an inch and is preferably in the range of 15 to 20 thousandths of an inch. Another type of insert is disclosed in U.S. Pat. No. 4,103,662. It includes an inner sleeve or tube of spring-tempered phosphor bronze and an outer carrier sleeve or tube of steel or aluminum. The separate formation of the inner and outer sleeves allows precise control of wall thicknesses, diameters, and concentricities. Yet another type of insert is shown in U.S. Pat. No. 5,249,555. These inserts are made from phosphor bronze, but include thin walls having and tapered ends to facilitate insertion.

With each type of valve insert disclosed in the aforementioned patents, the finish-reaming step is typically performed with a high-speed reamer. Reamers are fabricated in a plurality of graduated standard diameter sizes to accommodate the different sizes of valve guides. The reamers each include a plurality of flutes, which define cutting blades. The flutes may be straight or spiral cut. Typically, a spiral flute reamer is used, since it provides a better finish and a smoother cutting of the insert passageway than a straight cut reamer.

Conventional reamer blades each include a rake face, a cutting edge, a land having constant-width, a margin and a relief, and a trailing portion. The land may be circular or convex and is typically relieved to avoid interference and rubbing with the work piece. Such reamers may be manufactured from high-speed steel, and a fluting cutter is employed to cut the flutes into the reamer blank. Further, the reamer portion may be back tapered to prevent binding of the reamer within the bore, which is being enlarged and finished. Examples of prior reamers may be found in U.S. Pat. Nos. 2,940,342 entitled Reamers, issued Jun. 14, 1969, to Lavallee, and 4,231,693 entitled Reamer with Radial Relief, issued Nov. 4, 1980, to James A. Kammeraad.

The finish reamers available prior to the reamers shown in U.S. Pat. No. 4,231,693 that were employed to finish the passageways of phosphor bronze valve inserts suffered from various problems primarily related to wearability. These prior reamers, after several reaming operations, were no longer able to hold their size. Continued use of the tool for additional reaming operations resulted in unacceptable dimensioning and finishing of the phosphor bronze valve guide insert.

The reamer shown in U.S. Pat. No. 4,231,693 has been highly successful, but further improvement is desired in terms of further extended tool life, further improved heat dissipation, and an improved configuration having less tendency to chatter, scuff, or drag on a finished surface, yet that maintains the effectiveness of the finishing section of the reamer. Nonetheless, the reamer itself must be readily manufacturable.

Therefore, an improved reamer is desired solving the aforementioned problems and having the aforementioned advantages.

SUMMARY OF THE INVENTION

In one aspect of the present invention a finish reamer is adapted to finish ream a hard material. The finish reamer includes a reamer member having a back tapered body section. The body section includes a plurality of flutes that define a plurality of cutting blades. Each cutting blade includes an axially extending radial relief formed therein for dissipating heat during reamer operation, with the relief extending along a longitudinal portion of the cutting blade. Each of the cutting blades further includes a surface-finish portion rearwardly of the radial relief. Each of the cutting blades still further includes a cutting edge and a land. Each land includes a margin and a heel, with the heel being oriented at a relief angle to the margin. Each margin includes a length and a variable width that varies along the length in a predetermined manner chosen to improve heat dissipation and tool efficiency. In a narrower form, the front width is narrower than the rear width by about 50 percent, and the variable width varies linearly relative to a longitudinal position of the margin.

In another aspect of the present invention, a finish reamer is adapted to finish ream a valve guide insert. The finish reamer includes a body section having a plurality of flutes formed therein defining a plurality of cutting blade. Each cutting blade includes an axially and longitudinally extending radial relief formed therein, and further includes a land with a margin. The margin includes a non-uniform width that is smaller near a leading portion of each cutting blade and larger near a trailing portion of each cutting blade.

In another aspect of the present invention, a finish reamer is adapted to finish ream a hard material. The finish reamer includes an elongated member having a body section with flutes defining a plurality of cutting blades. Each cutting blade includes a cutting edge and a land. Each land includes a margin having an edge in common with the cutting edge and a heel. The heel is orientated at a relief angle to the margin. An initial width of the margin is about 14 to 30 percent or less of the overall width of the land, and a trailing width of the margin is about 32 to 62 percent or more of the overall width of the land.

In yet another aspect of the present invention, a finish reamer is adapted to finish ream a hard material. The finish reamer includes a reamer member having a back tapered body section. The body section includes a plurality of flutes that define a plurality of cutting blades. Each cutting blade includes an axially extending radial relief formed therein for dissipating heat during reamer operation that extends along a longitudinal portion of the cutting blades. Each cutting blade includes a surface-finish portion rearwardly of the radial relief. Each cutting blade includes a cutting edge and a land. Each land includes a margin and a heel. The heel is oriented at a relief angle to the margin. The margin includes a length and a portion along the length having a width that is less than or equal to about 0.007 inches and that is less than half of a width of the land.

Testing has shown that a reamer made accordingly to the present invention has a surprisingly and unexpectedly increased tool life over the reamer shown in U.S. Pat. No. 4,231,693.

These and other aspects, objects, and advantages of the present invention will be further understood and appreciated by persons skilled in the art by a thorough reading of the present specification, claims, and appended drawings.

BRIEF DESCRIPTION OF THE DRAWINGS

FIG. 4 is a cross-sectional view taken along the line IV—IV in FIG. 1;

FIG. 5 is an enlarged view of the circled area V in FIG. 4;

FIG. 5A is an enlarged view identical to FIG. 5;

FIG. 6 is a cross-sectional view taken the line VI—VI in FIG. 1; and

DETAILED DESCRIPTION OF THE PREFERRED EMBODIMENT

Figure 1:
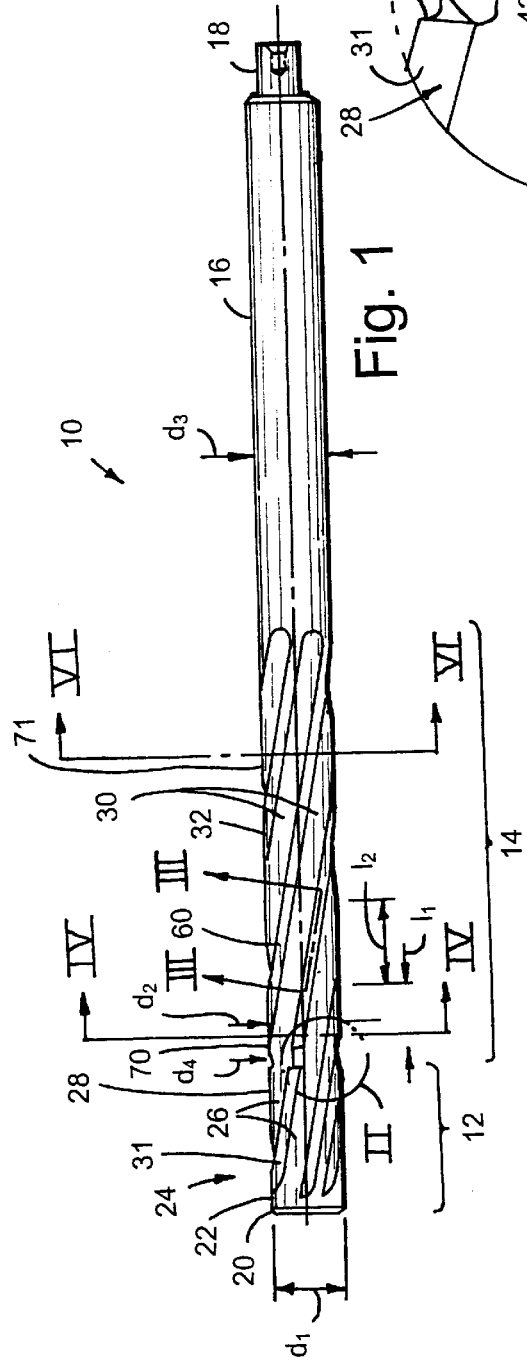
FIG. 1 is a side elevational view of a finish reamer in accordance with the present invention.

A finish reamer or tool 10 (FIG. 1) includes an elongated member having a pilot section 12, a finishing or body section 14, and a cylindrical shank section 16. The cylindrical shank section 16 terminates in a conventional tang 18. The tang 18 is configured to be chucked into a suitable power tool in a conventional fashion.

The pilot section 12 (FIG. 1) includes a conical or chamfered leading end 20, a cylindrical portion 22, and a fluted portion 24. Portion 24 includes a plurality of flutes 26. Flutes 26 are formed in the reamer blank in a conventional fashion employing a fluting cutter, which removes material from the blank. Each of the flutes 26 defines a cutting blade 28.

The body section 14 (FIG. 1) similarly includes a plurality of flutes 30. Flutes 30 are a continuation of flutes 26 formed in a pilot section 12 of the tool 10. Flutes 30 define a finish reamer section of the cutting blades 32. In the preferred embodiment, six flutes are formed in the tool 10 and they assume a right-hand helix or spiral angle of 10 degrees with respect to the longitudinal centerline of the tool 10. In the illustrated finish reamer 10, the flutes 30 each include an opposing flute located at 180 degrees (FIG. 4), but otherwise the flutes 30 are nonuniformly spaced circumferentially around the tool 10 to improve their operation and reduce chatter, such as at angles $X_1$–$X_6$ of 58, 62, 60, 58, 62, and 60 degrees, respectfully.

The blades 28 (FIG. 1) of the pilot section 12 are tapered. Blades 28 and the cylindrical portion 22 pilot or align the tool 10 within a valve guide bore of a cylinder head or other part, which is being finished. Each cutting blade 28 includes a land 31, which is a full circular land and has no relief. As seen in FIG. 5, each of the blades 32 of the body section 14 includes a circumferentially forwardly rounded or "J" shaped leading edge 35, a concavely-shaped rake face 34, a land 36 which includes a variable margin 38 and a heel 40, and a trailing surface 42. The heel 40 of each land 36 is angled relative to a line extending tangentially from the margin 38 at a relief angle designated "a" (FIG. 5). In the preferred embodiment, the relief angle "a" is approximately 10 degrees. Rake face 34 is angled circumferentially forwardly from a radial direction, as seen in FIG. 5, at a rake angle designation "b." In the preferred embodiment, rake angle "b" is approximately 9 degrees in a circumferentially forward direction. This helps in both forming the reamer 10 and also in heat dissipation and tool life when using the reamer 10. The concave shape of the rake face 34 positions the cutting edge 44 circumferentially forward from a radial line extending perpendicularly to the axis of the reamer 10 where the radial line passes tangentially to the concave rake face 34. The intersection between the rake face 34 and the margin 38 defines a cutting edge 44. Rake face 34 and margin 38 of the body section 14 are formed in a conventional fashion by conventional processes.

Figure 2:
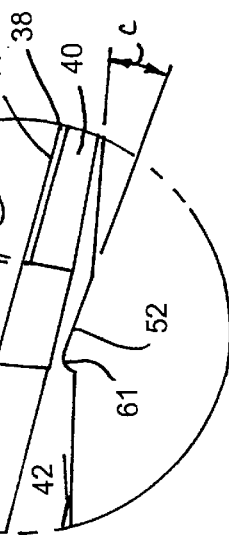
FIG. 2 is a greatly enlarged pictorial view of a portion of the reamer circled as area II in FIG. 1.

As best seen in FIG. 2, each blade 28 terminates in an angled surface 50. The leading edge of the body section 14 is defined by a J-shaped chamfer 52 cut into each blade 28. In the preferred embodiment, chamfer 52 has a chamfer angle designated "c" in FIG. 2 of approximately 30 degrees. Further, each chamfer 52 is ground with a chamfer relief angle relative to a line perpendicular to the longitudinal centerline of the tool 10 and generally designated "d" of approximately 12 degrees.

It is presently preferred that the cylindrical portion 22 of the pilot section 12 have a constant diameter designated "$d_1$" in FIG. 1. Tool 10 tapers to a point of maximum diameter from the beginning or leading edge of the blades 28 in the pilot section 12 to a point spaced rearwardly from the chamfers 52 on the body section 14. The point of maximum diameter is designated "$d_2$" in FIG. 1. The maximum diameter $d_2$ is the finish diameter of the bore to be reamed. The body section 14 has a back taper from the point of maximum diameter $d_2$ to a location just rearwardly of the cross-section lines VI—VI on the shank 16. The shank 16 is formed with a constant diameter designated "$d_3$." Each land 36 has an overall width designated "$W_1$" (FIG. 5A) and each circular margin portion 38 has a width designated "$W_2$" in FIG. 3. Further, the diameter between opposed leading edges 61 of chamfers 52 is designated "$d_4$" in FIG. 1.

Figure 3:
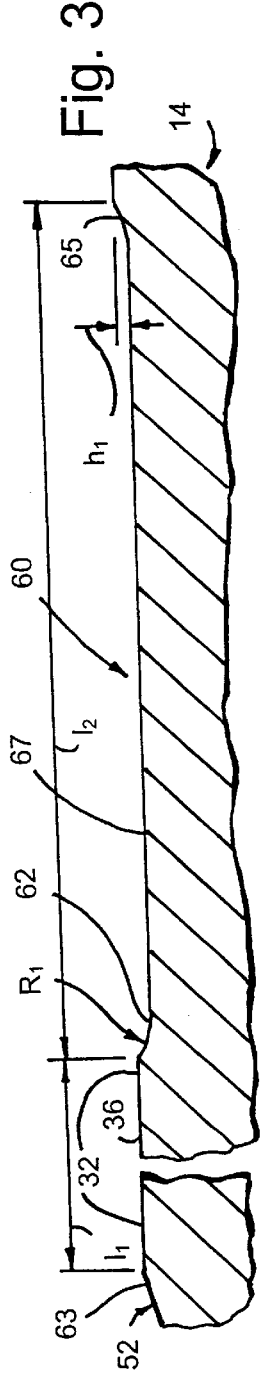
FIG. 3 is an enlarged cross-sectional view of the area III—III taken from FIG. 1.
Figure 7:
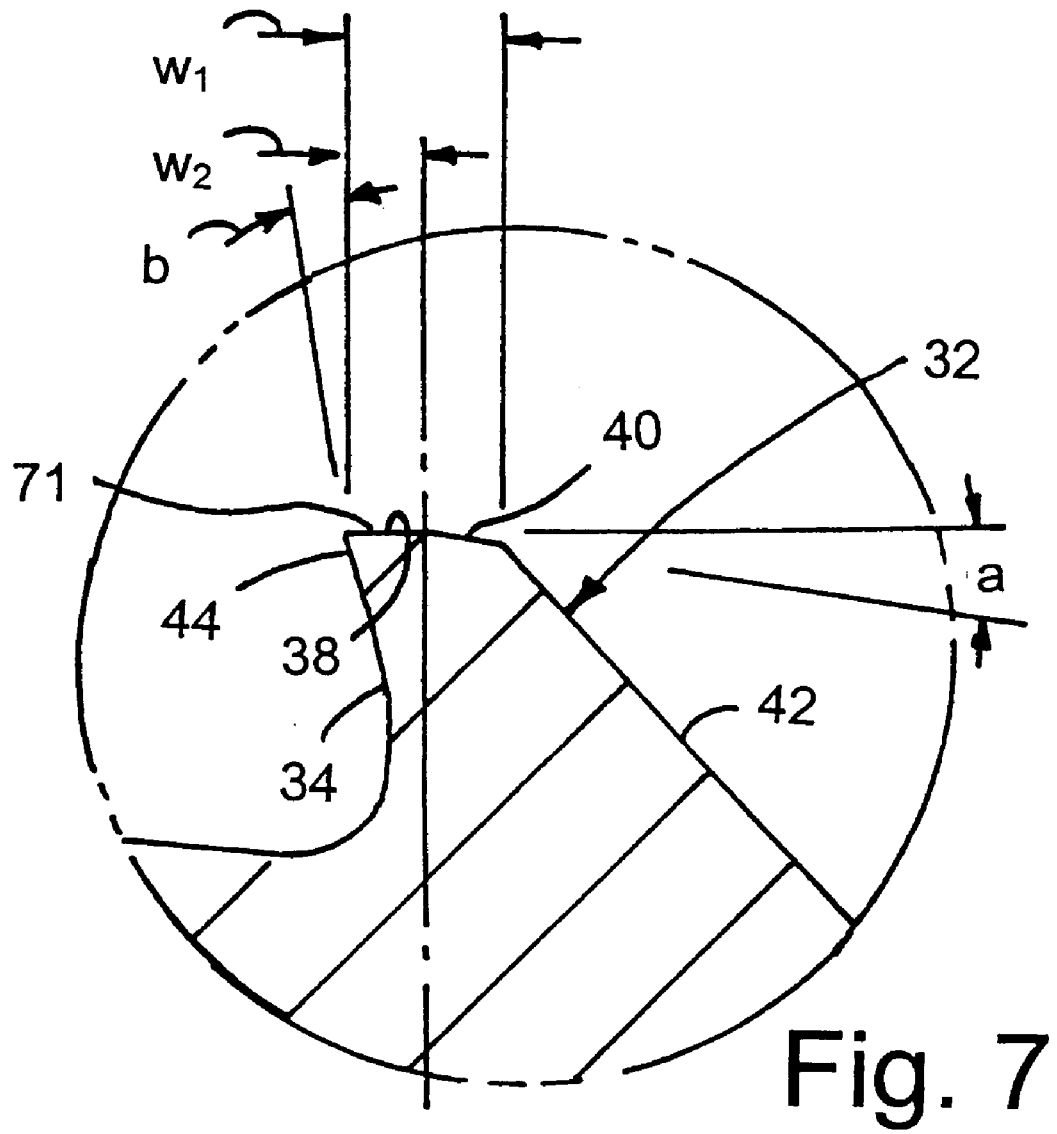
FIG. 7 is an enlarged view of the circled area VII in FIG. 6.

In accordance with the present invention, each of the cutting blades 32 of the body section 14 has ground therein an axially extending, radial relief 60 (FIG. 3). Each radial relief 60 is spaced a distance "$l_1$" from a trailing edge 63 of chamfer 52. Further, each radial relief 60 has a length "$l_2$" including rounded leading and trailing ends or edges having a radius "$R_1$," and a flat section or portion 67. Each radial relief 60 has a depth or height designated "$h_1$." The illustrated radial relief 60 has a length along the blade 32 of about 0.500 inches and a depth of about 0.007 inches, although it is contemplated that alternative lengths and depths are possible. Radial relief 60 is ground into the land 36 of the cutting blades 32 at points spaced rearwardly from the point of maximum diameter of the tool 10 and rearwardly from the trailing edge 63 of chamfer 52. Further, the depth or height $h_1$ of each radial relief 60 is such that the tool 10 in the area of the radial relief 60 does not engage the work surface.

The length dimension of each radial relief 60 and the positioning on the cutting blade 32 is such that a terminal edge 65 is located rearwardly of the point of maximum diameter $d_2$ along the back taper of the tool 10. The cutting blades 32 continue rearwardly of the radial relief 60. The positioning of the radial relief 60 prevents the occurrence of a secondary spiral being cut in the work piece. The portions of each cutting blade 32 rearwardly of the radial relief 60 assist in piloting the tool 10 and improve the surface finish. If terminal edge 65 were not along the back taper, another cutting edge 44 would be formed giving unacceptable results. The cutting blade portions 32, rearward of the radial reliefs 60, are necessary for a good finish when the tool 10 is used to ream the rather long valve insert bores.

It is believed that the radial relief 60 significantly increases heat dissipation and significantly reduces the heat generated during operation of the tool 10. Increased heat dissipation increases the efficiency of finish cutting the bore and also effectively reduces cutting pressures.

The prior approach to achieving increased tool life has generally been to maintain or increase the width $W_2$ of margin portion 38, and further to maintain the width of the margin 38 at a constant dimension. This approach has been used particularly with tools designed to ream cast iron. The reamer shown in U.S. Pat. No. 4,231,693 used a reduced width on its margin portion, but had a constant width. The present tool 10 includes a reduced margin width that varies along its length. This is very different from and contrary to normal practice in the industry. Further, it is believed to be counter-intuitive to use a varying width land on a narrow width land because of potential quality control problems, potential durability problems, and potential chipping and wear problems. In tool 10, the rake angle "a," the dimensions $W_2$ and $W_1$, and the positioning and dimensioning of the radial reliefs 60 co-act to very effectively increase heat dissipation and eliminate hole dimension changes due to expansion of the tool 10 and the work piece during operation from the heat generated. However, the cutting blade portions 32, rearward of the radial reliefs 60, are further able to very accurately align with and surface finish the bore being reamed, since the change in the tool 10 and work piece dimensions due to heat are effectively stopped. The reduced margin width and the non-uniform margin width further reduce friction thereby reducing heat generation and heating of the tool 10 and the work piece. It is noted that, by using a reamer 10 having a margin 38 that varies from a very narrow front end width of about 0.007 inches to a rear end width of about 0.016 inches, the surface area is reduced by over 25 percent from a margin that has a constant width of 0.016 inches (see the reamer of U.S. Pat. No. 4,231,693). This can be important in reducing surface contact with the valve guide bore being reamed, particularly as the cutting edge 44 becomes worn even a small amount.

Reamers are fabricated in a plurality of graduated diameter sizes to finish ream the various sizes of valve guide inserts presently available. Presently existing embodiments of the finish reamer 10 have a pilot section 12 with an overall longitudinal dimension of about 1.00 inch, a body section 14 with an overall longitudinal dimension of about 2.50 inches, and an overall length of approximately 7.00 inches. The frustoconical portion or front surface 20 of pilot section 12 is chamfered or beveled at an angle of 30 degrees from vertical.

Cylindrical portion 22, in one such presently existing embodiment, has a diameter $d_1$ of approximately 0.295 inches, dimension $d_4$ is approximately 0.248 inches, and the maximum diameter $d_2$ of the body section 14 is approximately 0.310 inches. This maximum diameter occurs at a point spaced 0.125 inches from a trailing edge 63 of chamfer surface 52. It is preferred that the back taper runs towards shank portion 16 the full axial length of cutting blades 32. The preferred back taper is equal to 0.0008 to 0.0010 inches per inch. The leading edge 62 of each radial relief 60 is positioned at a distance $l_1$ of approximately 0.375 inches rearwardly along the cutting blade 32 from the trailing edge 63 of chamfer surface 52. The overall length $l_2$ of the radial relief 60 is approximately 0.5 inches and the depth or height $h_1$ is approximately 0.007 inches. The radius $R_1$ is approximately 0.060 inches and the diameter $d_3$ of the shank portion 16 is approximately 0.305 inches. The overall circular land width $W_1$ of each cutting blade 32 is constant at approximately 0.034 inches. However, the width $W_2$ of the margin 38 varies and is within the range of 0.005 to 0.010 inches at its leading end 70 (FIG. 5A) and is in the range of 0.011 to 0.021 inches at its trailing end 71, and most preferably is about 0.007 inches at its leading end 70 and is about 0.016 inches at its trailing end 71. In other words, the width of the margin 38 at its leading end 70 is within the range of 14.7 to 29.4 percent of the land 36, or more preferably 20.5 percent of the width of the land 36, and at its trailing end 71 in the range of about 32.4 to about 61.8 percent or more, preferably 47.1 percent of the width of the land 36.

The ratio of the length $l_2$ of the radial relief 60 along the cutting blade 32 to the longitudinal dimension of the body section 14 is approximately 0.200 inches. The ratio of the depth $h_1$ of the radial relief 60 to the overall length $l_2$ of the radial relief 60 is approximately 0.014 inches. It is presently preferred that the tool 10 be fabricated from high-speed steel and heat treated to a minimum hardness of about RC-63. Further, it is preferred that the shank 16 be polished after heat treating to insure that there are no burrs or sharp edges on the shank 16. Notably, it is contemplated that other materials, such as carbon steel or carbide, could be used.

In the method of rebuilding a valve guide employing the tool 10 in accordance with the present invention, tubular bronze inserts of the type illustrated in the aforementioned U.S. patents are positioned within a bored valve guide. The tool 10 is then chucked to a suitable power tool, positioned within the tubular insert, and rotated to finish ream the insert to the predetermined inner diameter. To the extent necessary, the disclosures of the aforementioned U.S. Pat. Nos. 3,828, 415; 4,103,662; and 4,231,693 are hereby incorporated by reference.

In view of the foregoing description, it should be readily apparent to those of ordinary skill in the art that the unique finish reamer in accordance with the present invention possesses significant advantages when compared to the prior high-speed finish reamers. The reamer in accordance with the present invention possesses significantly increased tool life, an increase in ease of use, the ability to hold the proper hole size longer, and results in significantly reduced costs than have heretofore been obtainable.

Various modifications could undoubtedly be made to the reamer illustrated, which would not depart from the inventive concepts disclosed herein. For example, it is believed that the land 36 could be a smooth or convex surface, and that the specific shape and variation of the margin 38 could be varied from the linearly varied margin illustrated, while still obtaining the improved results of the present invention. The primary consideration with the formation of the variable width margin 38, it is believed, is that it be dimensioned so as to not contact the bore or work surface during reamer operation. Further, while it is preferred that the tool 10 include pilot section 12 to insure concentricity with the bore, the finish reaming operation is performed primarily at a leading end 70 of the body section 14. Accordingly, the pilot section 12 could be dispensed without departing from the inventive concepts disclosed herein. It is expressly intended, therefore, that the above description should be considered as that of the preferred embodiment, with the true spirit and scope of the present invention being determined by reference to the appended claims.

The invention claimed is:

1. A finish reamer adapted to finish ream a hard material, said finish reamer comprising:

a reamer member having a back tapered body section, said body section having a plurality of flutes that define a plurality of cutting blades, each cutting blade having an axially extending radial relief formed therein for dissipating heat during reamer operation that extends along a longitudinal portion of said cutting blade, each of said cutting blades including a surface-finish portion rearwardly of each of said radial relief, each of said cutting blades including a cutting edge and a land, each of said lands including a margin and a heel, with the heel being oriented at a relief angle to said margin, each said margin including a length and a non-uniform width that varies along the length in a predetermined manner chosen to improve heat dissipation and tool efficiency.

2. The finish reamer defined in claim 1 wherein the non-uniform width varies from a narrower width located on a leading portion of the margin to a wider width located on a trailing portion of the margin.

3. The finish reamer defined in claim 2 wherein the narrower width is less than about 50 percent of the wider width.

4. The finish reamer defined in claim 3 wherein the wider width is about 0.016 inches.

5. The finish reamer defined in claim 4 wherein the narrower width is less than or equal to about 0.007 inches.

6. The finish reamer defined in claim 2 wherein a particular width of the non-uniform width varies linearly with a corresponding longitudinal position on the length.

7. The finish reamer defined in claim 1 wherein the non-uniform width has a particular width at a predetermined location along the length that is less than or equal to about 0.007 inches.

8. The finish reamer defined in claim 1 wherein the reamer member defines an axis of rotation, and wherein the cutting blades each include a rake face that defines a cutting edge with an associated one of the margins, the rake face being concavely shaped and having a portion adjacent the cutting edge that is angled circumferentially forwardly from a radial line extending perpendicular to the axis of the reamer member and that passes tangentially to the concave rake face.

9. A finish reamer adapted to finish ream a valve guide insert, the finish reamer comprising:

a body section having a plurality of flutes formed therein;

said flutes defining a plurality of cutting blades; and each said cutting blade having an axially and longitudinally extending radial relief formed therein, and further having a land with a margin, the margin having a non-uniform width that is smaller near a leading portion of each cutting blade and larger near a trailing portion of each cutting blade.

10. The finish reamer defined in claim 9 wherein the non-uniform width varies linearly from a narrower width on the leading portion to a wider width on the trailing portion.

11. The finish reamer defined in claim 10 wherein the narrower width is about 50 percent or less than the wider width.

12. The finish reamer defined in claim 11 wherein the wider width is about 0.016 inches.

13. The finish reamer defined in claim 12 wherein the narrower width is about 0.007 inches.

14. The finish reamer defined in claim 9 wherein the narrower width is about 0.007 inches.

15. The finish reamer defined in claim 9 wherein the body section defines an axis of rotation, and wherein the cutting blades each include a rake face that defines a cutting edge with an associated one of the margins, the rake face being concavely shaped and having a portion adjacent the cutting edge that is angled circumferentially forwardly from a radial line extending perpendicular to the axis of the reamer member and that passes tangentially to the concave rake face.

16. A finish reamer adapted to finish ream a hard material, said finish reamer comprising:

an elongated member having a body section with flutes defining a plurality of cutting blades, each of said cutting blades including a cutting edge and a land, each of said lands including a margin having an edge in common with said cutting edge and a heel, said heel being orientated at a relief angle to said margin, an initial width of said margin being about 14 to 30 percent or less of the overall width of said land, and a trailing width of said margin being about 32 to 62 percent or more of the overall width of said land.

17. The reamer defined in claim 16 wherein the initial width is in the range of 14 to 30 percent of the overall width of the land.

18. A finish reamer adapted to finish ream a hard material, the finish reamer comprising:

a reamer member having a back tapered body section, said body section having a plurality of flutes that define a plurality of cutting blades, each cutting blade having an axially extending radial relief formed therein for dissipating heat during reamer operation that extends along a longitudinal portion of said cutting blades, each of said cutting blades including a surface-finish portion rearwardly of each of said radial relief, each of said cutting blades including a cutting edge and a land, each of said lands including a margin and a heel, with the heel being oriented at a relief angle to said margin, each said margin including a length and a portion along the length having a width that is less than or equal to about 0.007 inches and that is less than half of a width of the land.

19. The finish reamer defined in claim 18 wherein the reamer member defines an axis of rotation, and wherein the cutting blades each include a rake face that defines a cutting edge with an associated one of the margins, the rake face being concavely shaped and having a portion adjacent the cutting edge that is angled circumferentially forwardly from a radial line extending perpendicular to the axis of the reamer member and that passes tangentially to the concave rake face.

20. The finish reamer defined in claim 18 wherein the width of the margin varies linearly from a narrow width of about 0.007 inches at one end to a wider width of about 0.016 inches at another end, the width of the lands being about 0.040 inches.

* * * * *